F. McGREGORY.
DIRIGIBLE AUTOMOBILE LAMP.
APPLICATION FILED JUNE 4, 1914.
1,121,856.
Patented Dec. 22, 1914.
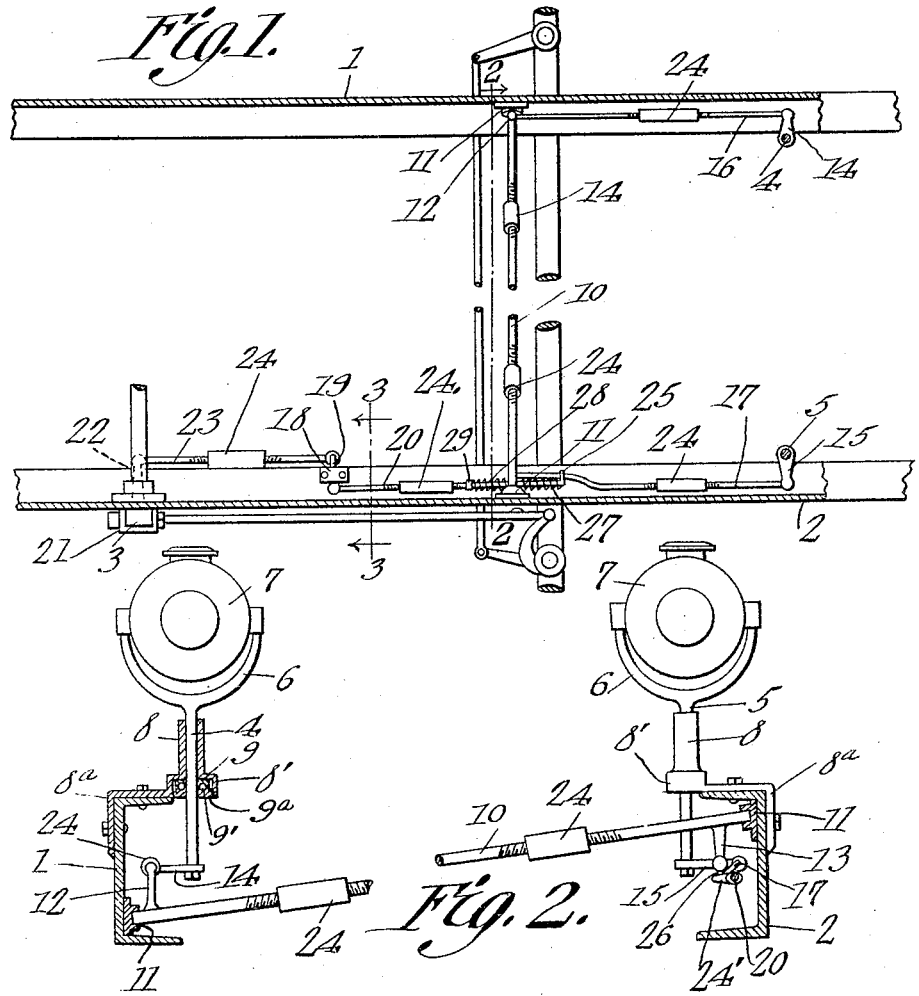
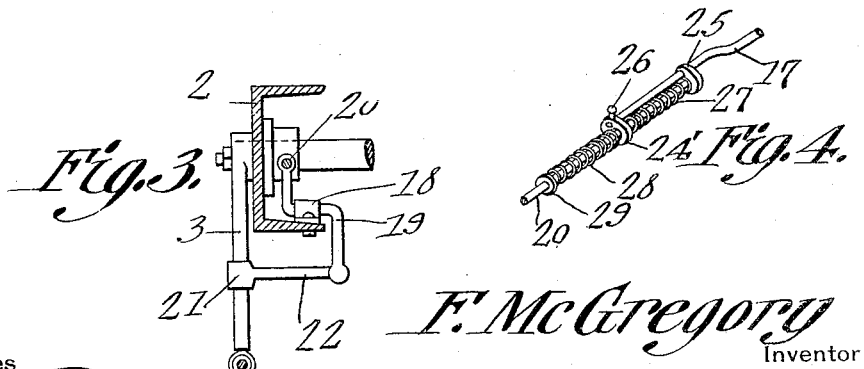
F. McGregory
Inventor
Witnesses
by C. A. Snow & Co.
Attorneys

UNITED STATES PATENT OFFICE.

FRED McGREGORY, OF DECATUR, ILLINOIS.

DIRIGIBLE AUTOMOBILE-LAMP.

1,121,856.   Specification of Letters Patent.   Patented Dec. 22, 1914.

Application filed June 4, 1914. Serial No. 843,028.

*To all whom it may concern:*

Be it known that I, FRED McGREGORY, a citizen of the United States, residing at Decatur, in the county of Macon and State of Illinois, have invented new and useful Dirigible Automobile-Lamps, of which the following is a specification.

The present invention appertains to dirigible automobile lamps, and aims to provide novel and improved means for swinging the lamps of a motor vehicle, with the steering wheels, whereby the road or highway to be traversed by the machine will be properly illuminated under the various conditions.

The present invention also contemplates the provision of an apparatus of the character described, which will be applicable to various types of motor vehicles, and which will not appreciably encumber the machine.

It is also within the scope of the present invention, to provide a device of the character specified, which will be comparatively simple, compact, durable, and inexpensive in construction, which will be applicable to a motor vehicle in such a manner, so as to conceal the greater portion of the working parts, and which will be practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention has been illustrated in its preferred embodiment in the accompanying drawing, wherein:—

Figure 1 is a fragmental plan view of the apparatus as applied to the chassis of a motor vehicle. Figs. 2 and 3 are enlarged cross sectional views taken on the lines 2—2 and 3—3 respectively of Fig. 1. Fig. 4 is a fragmentary perspective view of the shock absorbing means.

In the drawing, the numerals 1 and 2 indicate the side channels of a motor vehicle chassis or frame and the numeral 3 designates the depending oscillatory steering arm or lever at the outer side of the channel 2, which is common, and which is operatively connected to the steering post (not shown). The arm 3 is operatively connected with the steering gear in the usual manner, which need not be illustrated or described in detail.

The present attachment, which as illustrated is adapted particularly for two head lights, embodies a pair of lamp brackets having the upright standards 4 and 5 disposed directly inside the respective channels 1 and 2. The standards 4 and 5 are provided with upper forks 6 within which the lamps 7 are mounted, as usual. The standards 4 and 5 are journaled to the channels 1 and 2, respectively, and to this end upright bearings 8 embrace the standards 4 and 5 and have angular brackets $8^a$ bolted or otherwise secured over the channels 1 and 2. The bearings 8 have lower sockets or counter bores 8' and ball bearing cups 9 are secured to the standards 4 and 5 within the sockets or recesses 8' while ball bearing cups or cones $9^a$ are threaded or otherwise engaged within the mouths of the sockets 8' below the cups or collars 9. A series of ball bearings 9' are disposed within or between the ball cups 9 and $9^a$ to support the standards 4 and 5 for free oscillatory movements. The standards 4 and 5 depend or project below the bearings 8 at the inner sides of the channels, for the connection of the controlling means, as will presently appear.

The controlling means for the lamp brackets embodies a transverse inclined rock shaft 10 disposed between the channels 1 and 2, preferably below the hood in rear of the radiator, so as to be concealed. The terminals of the rock shaft 10 are journaled to the inner sides of the webs of the channels 1 and 2, by means of socket bearings 11 secured to the webs of the channels and receiving the terminals of the rock shaft.

The rock shaft 10 is provided at its lower end with an upstanding arm 12 adjacent the channel 1, and between the flanges thereof, and is provided adjacent its upper end with a depending arm 13 within the channel 2. Arms 14 and 15 are attached to the lower extremities of the lamp standards 4 and 5 and project within the respective channels 1 and 2, and to this end, a link 16 connects the free ends of the arms 12 and 14 to operatively connect the standard 4 with the rock shaft, and a link 17 connects the free ends of the arms 13 and 15 to operatively connect the standards 5 with the rock shaft. Thus, when the shaft 10 is oscillated, the standards 4 and 5 will be rocked or oscillated in like directions. The joints between the said links and arms are preferably ball and sockets, or universal joints.

The rock shaft 10 is actuated from the steering arm 3, and to this end a bearing 18 is secured upon the lower flange of the channel 2 in rear of the rock shaft 10 or between the rock shaft and the steering arm 3, a lever 19 having its intermediate portion journaled through the bearing 18 and having upstanding and depending arms. The upstanding arm of the lever 19 has the rear end of a link 20 connected thereto by a ball and socket joint and the forward end of the link 20 is yieldably connected to the link 17 as will hereinafter appear in detail. A clamp 21 embraces the steering arm 3, and has an arm 22 projecting inwardly below the channel 2 and which has its free end connected to the lower arm of the lever 19 by means of a link or connecting rod 23. Thus, when the steering arm 3 is oscillated, oscillatory motion will be imparted to the lever 19 through the medium of the link 23, and the lever 19 in being oscillated or vibrated, will rock the shaft 10. Each of the said links or rods 16, 17, 20 and 23, as well as the shaft 10, is preferably composed of sections connected by a turnbuckle 24, whereby the said parts may be extended and contracted, to accommodate the particular machine to which the attachment is applied and to enable the attachment to be adjusted for various types or makes of motor vehicles.

The links 17 and 20 are connected in a peculiar manner, to provide a shock absorbing device. Thus, the rear end of the link 17 is provided with a head or portion 24′ slidably engaging the link 20, and the forward end of the link 20 is provided with a portion or head 25 slidably engaging the link 17. The portion or head 24 of the link 17 is provided with an upstanding knob or head 26 which is loosely connected to the socket at the lower end of the arm 13, to provide the ball and socket connection between the arm 13 and link 17. A coiled wire expansion spring 27 is disposed on the link 20 between the portions or heads 24 and 25, and a second coiled wire expansion spring 28 is disposed upon the link 20 in rear of the portion or head 25. A collar 29 is secured upon the link 20, the spring 28 being disposed between the collar 29 and the portion or head 24, whereby the springs 27 and 28 will balance each other and tend to maintain the head or portion 24 of the link 17 at a normal position between the collar 29 and portion 25 of the link 20.

In practice, when the attachment is applied to a motor vehicle, which may be readily accomplished, the greater portion of the apparatus will be concealed or inclosed, whereby the apparatus will not present any encumbering projections. When the steering shaft 3 is turned in the opposite directions, the lamp brackets will be oscillated in the proper directions, and to angle the lamps with the steering wheels, whereby the light may be thrown to one side or the other, when the machine is being steered. Thus, when the steering arm 3 is swung forwardly, to steer the machine to the right, as seen in Fig. 1, the arm 22 carried by the arm 3 will be swung forwardly, and will thus swing the lower or depending arm of the lever 18 forwardly. This will swing the upper arm of the lever 19 rearwardly, to draw the links 20 and 17 rearwardly, and consequently, the depending arm 13 of the rock shaft 10 will be swung rearwardly, as well as the arm 15 of the standard 5. Thus, the standard 5 will be swung clockwise as seen in Fig. 1, and the rock shaft 10 in being swung in the manner indicated, will swing the arm 12 thereof forwardly, to thereby swing the arm 14 of the standard 4 in a similar direction to turn the standard 4 clockwise, similar to the standard 5. Conversely, when the steering arm 3 is swung rearwardly, to steer the machine to the left, as seen in Fig. 1, the lamp standards 4 and 5 will be swung in a counter-clockwise direction, as viewed in Fig. 1, so that it will be evident that the head lights or lamps will be angled similar to the steering wheels under the various conditions. When the steering wheels are at neutral and normal positions, the lamps will be directed straight ahead.

When the link 20 is reciprocated, the respective springs 27 and 28 will be moved toward the head or portion 24 of the link 17, to thereby provide a means for yieldingly swinging the shaft 10. In this manner, the springs 27 and 28 will absorb the shocks, incident to the quick or jerky movement of the respective parts, and whereby the lamp standards will readily respond to the movement of the steering arm 3 with a slight yielding effect.

The present apparatus may be altered in its construction within the scope of the appended claims, to adapt the apparatus to various motor vehicles, including electric cars and trucks, and accommodate various lamps.

Having thus described the invention, what is claimed as new is:—

1. In an appliance of the character described, a pair of bearings attachable to the side channels of a motor vehicle chassis, lamp brackets including standards journaled through the said bearings and having lower arms, bearings attachable to the inner sides of the said channels, a rock shaft terminally journaled in the last mentioned bearings and having arms adjacent its ends, links connecting the arms of the rock shaft and the arms of the respective standards, and means for operatively connecting the rock shaft and the steering gear of the motor vehicle.

2. In an appliance of the character described, a pair of bearings attachable to the side channels of a motor vehicle chassis, lamp brackets including standards journaled through the said bearings and having lower arms, bearings attachable to the inner sides of the said channels, a rock shaft terminally journaled in the last mentioned bearings and having arms adjacent its ends, links connecting the arms of the rock shaft and the arms of the respective standards, an actuating link adapted to be connected to the steering gear of a motor vehicle, the actuating link and one of the aforesaid links having portions slidably engaging each other, and springs carried by the actuating link and seating against that portion of the corresponding link which slidably engages it.

In testimony that I claim the foregoing as my own, I have hereto affixed my signature in the presence of two witnesses.

FRED McGREGORY.

Witnesses:
V. T. CLANTON,
L. E. FOSTER.

Copies of this patent may be obtained for five cents each, by addressing the "Commissioner of Patents, Washington, D. C."